2,282,755

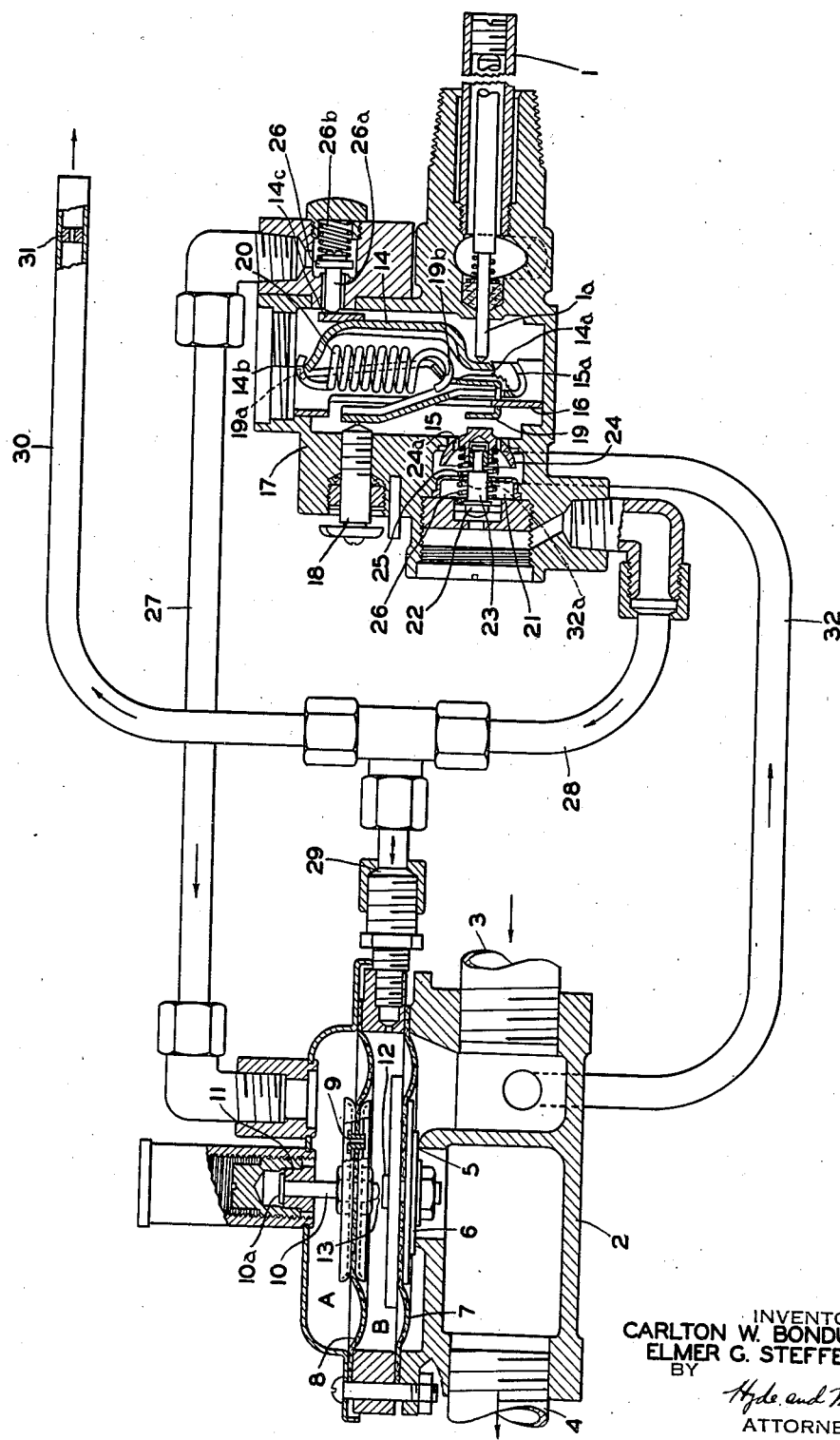
May 12, 1942. C. W. BONDURANT ET AL 2,282,755
COMBINED THERMOSTATIC VALVE MECHANISM
Filed April 26, 1941
INVENTORS
CARLTON W. BONDURANT &
ELMER G. STEFFEN
BY
Hyde and Meyer
ATTORNEYS Patented May 12, 1942

UNITED STATES PATENT OFFICE 2,282,755

COMBINED THERMOSTATIC VALVE MECHANISM

Carlton W. Bondurant, Euclid, and Elmer G. Steffen, Cleveland Heights, Ohio, assignors to The Titan Valve and Manufacturing Company, Cleveland, Ohio, a corporation of Ohio Application April 26, 1941, Serial No. 390,482

1 Claim. (Cl. 236—81)

This invention relates to improvements in thermostatically controlled valve mechanism and more particularly to a combination snap action and throttling valve limit control.

An object of the present invention is to provide an improved valve control mechanism by which a thermostatically operated device moves the valve to a throttling position rather than to a completely closed position with, however, the possibility of the thermostatic device continuing the valve closing action if the effect of the throttling control is not sufficient to correct the dangerous heat condition.

One of the objects of the present invention is to provide a snap action device adapted to completely close a diaphragm valve when the device has snapped over center with an additional arrangement for moving the valve to a throttling position before the thermostatic device has moved sufficiently to snap over center.

Other objects and advantages of our invention will appear from the accompanying drawing and description and the essential features will be set forth in the claim.

In the drawing, the figure shows a somewhat diagrammatic view of a combination of a thermostatically controlled snap acting device and a diaphragm valve, with most of the parts shown in section so as to more clearly disclose the operation of the various parts.

In the embodiment here disclosed, we have shown a common form of thermostat 1 which is intended for positioning at a point in a heating system where it acts as an emergency limit, that is to say it might be in the bonnet of a hot air furnace or somewhere in a hot water or steam system so that upon excessive rise of temperature the gas to the main burner would be closed off. It is believed unnecessary here to disclose any such heating system or burner but the valve 2 represents a valve in the line to such burner, which if closed will reduce the heat supplied to the thermostat 1 and of course reduce the temperature in the system when it has reached the desired emergency limit.

The valve 2 has a gas inlet 3 and an outlet 4 between which is a valve seat 5 adapted to be closed and opened by the valve 6 which is carried by the diaphragm 7. Spaced from this diaphragm in the same casing is another diaphragm 8 so that the casing is divided into a chamber A above the diaphragm 8 and a chamber B between the two diaphragms. Through the diaphragm 8 is a very small orifice 9. The diaphragm 8 is supported by a link 10 having at its upper end a shoulder 10a which engages a limiting abutment 11 on the casing when the diaphragm 8 reaches the lowermost limit of its travel. When pressure is supplied in chamber A but not in chamber B the link 10 at its free end below the diaphragm 8 will engage a central stud 12 connected with diaphragm 7 and valve 6 so as to move valve 6 downwardly but this movement will be insufficient to completely seat the valve 6 and therefore the gas pressure from the inlet 3 will hold the diaphragm 7 slightly raised so that a small amount of gas passes through the valve, thus producing a throttling effect. It will be noted in the drawing that with valve 6 completely closed there is a slight space at the point 13 between the end of link 10 and the stud 12. When pressure is applied in the chamber B the valve 6 is completely closed.

The thermostatically controlled snap acting device is shown at the right in the drawing. The thermostatically controlled rod 1a engages a main lever 14 which is pivoted at 14a on an adjusting lever 15 which in turn is fulcrumed at 15a in a frame 16 positioned in the housing 17. The position of this adjusting lever is controlled by a screw 18 operable from the front of the housing. A snap acting lever 19 is fulcrumed in the frame 16 at the point 19a. A tension spring 20 is connected between the free end 14b of the lever 14 and a point 19b on the lever 19. It results from this construction that when the point 14b moves to the right of the point 19a the line of action of spring 20 is shifted so as to cause lever 19 to move in a counterclockwise direction to the position shown in the drawing, whereas if the point 14b moves to the left of the point 19a then the spring will cause clockwise movement of lever 19 thus controlling the movement of the valve assembly 21.

This valve assembly is like that described and claimed in the copending application of Carlton W. Bondurant, Serial No. 308,595, filed December 11, 1939, now Patent No. 2,276,014, dated March 10, 1942, to which reference may be had for further details. Suffice it to say here that the valve 22 is mounted rigidly on one end of a stem 23 and a valve member 24 is slidably mounted on the other end of the stem with a spring 25 urging the member 24 toward its seat and a spring 26 urging the valve 22 toward its seat. It results from this construction that as the snap lever 19 moves away from the nose of the member 24 that member will first close and by the last increment of its closing movement will snap open the valve 22. It will be noted that the valve member 24 has a plurality of holes passing through it as indicated at 24a so that actually it never completely closes its associated opening.

An additional valve 26 is provided adapted to be opened by movement of lever 14 which is insufficient to cause snap action of lever 19. A projection 14c is welded on lever 14 for the purpose of opening valve 26. This valve has a square stem 26a in a round hole so that gas may flow along the stem and through the valve seat when the valve is opened. A spring 26b urges the valve toward its seat.

A conduit 27 connects the valved opening at 26 to chamber A. Conduits 28 and 29 connect the valved opening at 22 with chamber B. Conduit 30 provides a bleeder outlet which is throttled by an orifice 31. This bleeder outlet preferably leads to the pilot where escaping gas is burned. The orifice 31 is of greater capacity than the orifice 9 and of less capacity than the valved opening at 22. Pressure fluid is supplied to operate the diaphragms 7 and 8 and the most convenient manner to supply that fluid is by way of conduit 32 which connects with the valve housing 2 on the inlet side thereof so that gas under pressure is always available at conduit 32. This connects into the housing 17 at the point 32a.

The operation of the device just disclosed is as follows: Assuming that the thermostat 1 is being subjected to a temperature near the emergency limit (which has been adjusted by the screw 18), the rod 1a is moving toward the right. This causes main lever 14 to oscillate in a clockwise direction but before the point 14b has been carried to the right of the point 19a the projection 14c will open valve 26. Gas under pressure which is available at all times within the housing 17 because of the openings 24a will flow through conduit 27 to chamber A of the diaphragm valve. A certain amount will be vented through the orifice 9 but this is insufficient to vent the gas supplied through valve 26. No pressure will be built up in chamber B because valve 22 is still closed (when the point 14b is to the left of the point 19a) and the gas vented through the orifice 9 will bleed out through conduits 29 and 30 and the orifice 31 which is larger than the orifice 9. Under these circumstances diaphragm 8 will move downwardly to the limit of link 10 but as mentioned before this is insufficient to close valve 6 but will produce a throttling action of the flow of gas through valve 2. It results from this throttling of the gas to the burner that the thermostat 1 is subjected to less heat and the snap acting device may remain in a position of equilibrium or indeed the lever 14 may again move in a counterclockwise direction if the thermostat 1 is cooled sufficiently. However if the thermostat continues to become hotter in spite of the throttling of the gas supply through the valve 2, then the point 14b is carried to the right of the point 19a and lever 19 will move with snap action over center to the position shown in the drawing, permitting valve 22 to open because spring 25 is stronger than spring 26. Gas is then supplied under pressure through the valved opening 22 and conduits 28 and 29 to chamber B of the diaphragm valve. Some of this gas will escape at the orifice 31 but as mentioned before this orifice is less than the valved opening at 22 and therefore pressure builds up in chamber B so as to completely close the valve 6 upon its seat. Heat is therefore cut off and the thermostat 1 will gradually cool after which there will be a reverse movement of the parts permitting valve 6 to open when valves 22 and 26 have again become closed. At such a time the pressure in chambers A and B is vented through the orifice 31 and the gas pressure at the inlet 3 will raise valve 6 from its seat.

It is intended that valve 26 should be adjusted at the factory to open a predetermined time before the snap action of lever 19 occurs. As an example, this opening of valve 26 may be set to occur about 10° F. ahead of the snap-over action of lever 19. This relationship once fixed remains substantially constant for all temperature settings. This is true because of the arrangement of the parts whereby adjustment of lever 15 by screw 18 to vary the range of temperature controlled has little or no effect upon this relationship. To put it in other words, adjustment of screw 18 changes by approximately the same amount the temperature at which valves 24 and 26 open and close. This is true because as lever 15 is moved to vary the position of fulcrum 14a relative to rod 1a, there is very little effect on the movement of the free end of lever 14 or of the abutment 14c which actuates valve 26. The fulcrum 19a of lever 19 does not move because it is on the fixed frame 16 and the stem of valve 26 is a fixed distance from the fulcrum 19a. Therefore small changes in the position of the fulcrum end 14a of lever 14 have little or no appreciable effect upon the position of the parts at the free end of lever 14 which on the one hand cause movement of the snap lever and on the other hand cause movement of valve 26. Whatever the theoretical explanation may be, it is a fact that practical tests show no measurable difference in the interval between opening of the two valves 24 and 26 throughout the usual range of adjustment of the lever 15.

It is possible to use our improved device as the sole control for a heating system where no electricity is available for the usual control thermostats. The device is often used this way in a residential building in the course of construction where it is desired to run the heating system at substantially maximum capacity to heat the house either to dry out the plaster or for some other reason and at a time when there is no electricity or no other control thermostat installed. In such a case as will be well understood, the adjusting screw 18 may be set for some maximum safe temperature and the thermostat 1 will open and close the valve 6 within the limit of the range of movement of the snap acting device, thus keeping the heating system working near its maximum capacity but preventing dangerous overheating of the system.

What we claim is:

In combination, a valve casing having a gas inlet and outlet and a valve seat between them, a diaphragm valve coacting with said seat, a diaphragm in said casing spaced from said diaphragm valve and having a venting orifice therethrough and providing with said casing a first chamber on one side of said diaphragm and a second chamber on the other side of said diaphragm toward said diaphragm valve, said diaphragm engaging said valve to move it toward closed position upon a preponderance of pressure in said first chamber over said second chamber, means limiting movement of said diaphragm to a position short of that corresponding to fully closed position of said valve, a thermostat, a device controlled by said thermostat and having a gradually moving part and a snap acting part, a fluid tight housing for said device, a line communicating from said gas inlet to said housing, a valved outlet in said housing controllable by said gradually moving part, a connecting conduit between said valved outlet and said first chamber, a second valved outlet in said housing controllable by said snap acting part, a connecting conduit between said second valved outlet and said second chamber, a vent from said second named connecting conduit, and said vent having greater flow capacity than said orifice and having less capacity than said second valved outlet.

CARLTON W. BONDURANT.
ELMER G. STEFFEN.